United States Patent
Deng et al.

(10) Patent No.: US 11,173,863 B1
(45) Date of Patent: Nov. 16, 2021

(54) RESTRAINT SYSTEM

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/068,080

(22) Filed: Oct. 12, 2020

(51) Int. Cl.
| | |
|---|---|
| *B60R 21/231* | (2011.01) |
| *B60R 21/015* | (2006.01) |
| *B60R 21/276* | (2006.01) |
| *B60R 21/239* | (2006.01) |
| *B60R 21/0136* | (2006.01) |
| *B60R 21/264* | (2006.01) |
| *B60R 21/235* | (2006.01) |
| *B60R 21/26* | (2011.01) |
| *B60R 21/01* | (2006.01) |

(52) U.S. Cl.
CPC .... *B60R 21/23138* (2013.01); *B60R 21/0136* (2013.01); *B60R 21/01554* (2014.10); *B60R 21/235* (2013.01); *B60R 21/239* (2013.01); *B60R 21/264* (2013.01); *B60R 21/276* (2013.01); *B60R 2021/01286* (2013.01); *B60R 2021/23509* (2013.01); *B60R 2021/23523* (2013.01); *B60R 2021/26094* (2013.01)

(58) Field of Classification Search
None
See application file for complete search history.

(56) References Cited

U.S. PATENT DOCUMENTS

| | | | |
|---|---|---|---|
| 3,887,213 | A | 6/1975 | Goetz |
| 3,910,595 | A | 10/1975 | Katter et al. |
| 3,929,350 | A | 12/1975 | Pech |
| 5,542,695 | A | 8/1996 | Hanson |
| 6,874,811 | B2 | 4/2005 | Enders et al. |
| 7,021,654 | B2 | 4/2006 | Honda et al. |
| 8,573,635 | B2 | 11/2013 | Festag et al. |
| 8,616,578 | B2 | 12/2013 | Ohrai |

(Continued)

FOREIGN PATENT DOCUMENTS

| | | | | |
|---|---|---|---|---|
| CN | 204095593 U | * | 1/2015 | ............... B60N 2/44 |
| DE | 10156512 A1 | * | 8/2002 | ........... B60R 21/213 |

(Continued)

*Primary Examiner* — Faye M Fleming
(74) *Attorney, Agent, or Firm* — Frank A. MacKenzie; Bejin Bieneman PLC

(57) ABSTRACT

A restraint system includes a first plate, a second plate rotatably coupled to the first plate and rotatable away from the first plate from an undeployed position to a deployed position, a panel connected to the first plate and to the second plate, and a pyrotechnic activator coupled to the second plate. The panel is flexible relative to the first plate and the second plate. The first plate, the second plate, and the panel form a chamber having an interior volume. The pyrotechnic activator is arranged to, when discharged, rotate the second plate from the undeployed position toward the deployed position. One of the first plate or the second plate includes a vent hole in communication with the interior volume of the chamber.

20 Claims, 4 Drawing Sheets

(56) References Cited

U.S. PATENT DOCUMENTS

| | | |
|---|---|---|
| 9,205,795 B1 | 12/2015 | Cheng et al. |
| 9,233,660 B1 | 1/2016 | Farooq et al. |
| 9,637,080 B2 | 5/2017 | Ruthinowski et al. |
| 9,731,801 B2 | 8/2017 | Blenkarn et al. |
| 9,868,372 B2 | 1/2018 | McCoy et al. |
| 2004/0232666 A1 | 11/2004 | Sato et al. |
| 2017/0225640 A1* | 8/2017 | Ohno ................... B60R 21/239 |
| 2018/0334127 A1 | 11/2018 | Dziurda |
| 2019/0359167 A1 | 11/2019 | Breed et al. |
| 2020/0377050 A1* | 12/2020 | Saitou ..................... B60N 2/68 |

FOREIGN PATENT DOCUMENTS

| | | | |
|---|---|---|---|
| DE | 02004045968 A1 | 6/2005 | |
| DE | 102009049366 A1 | 4/2011 | |
| DE | 102014222085 A1 * | 5/2016 | ........... B60N 2/6009 |
| JP | H07164996 A * | 6/1995 | ........... B60R 21/216 |
| JP | H0948318 A * | 2/1997 | ............. B60R 21/26 |
| JP | 2004090814 A * | 3/2004 | ........... B60R 21/239 |
| JP | 2009029182 A | 2/2009 | |

* cited by examiner

RESTRAINT SYSTEM

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

DETAILED DESCRIPTION

Figure 1:
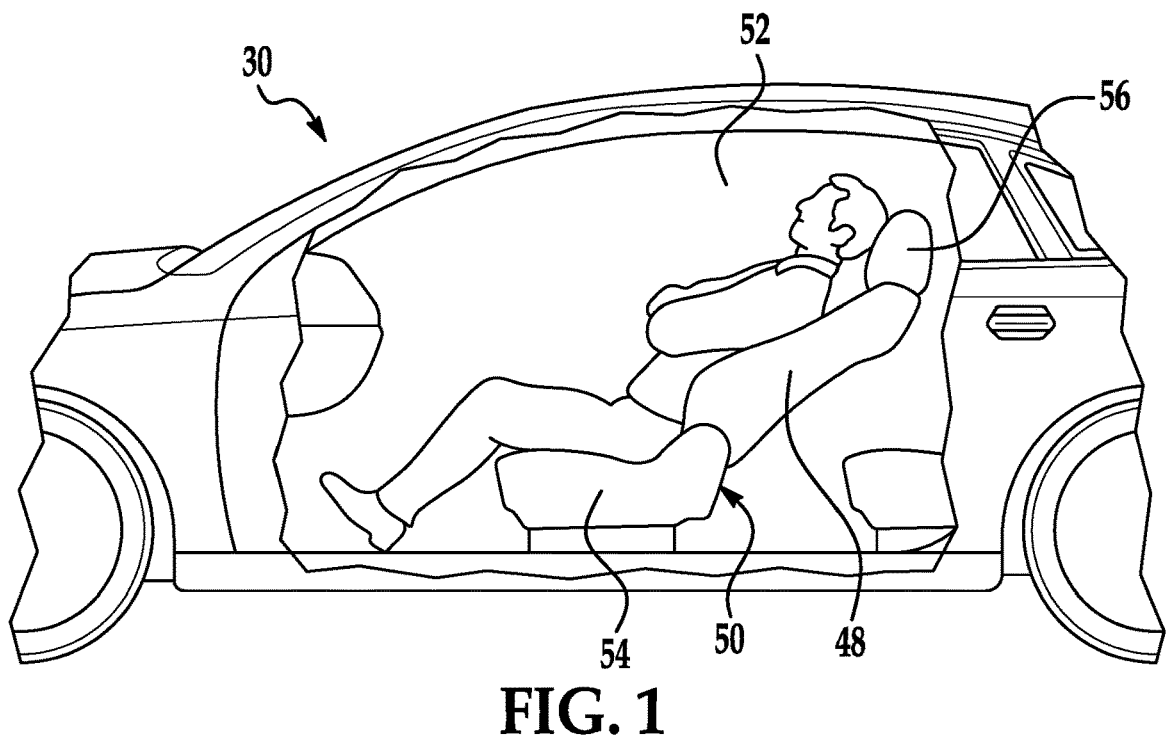
FIG. 1 is a side cutaway view of a vehicle with the passenger cabin exposed for illustration.

A restraint system includes a first plate, a second plate rotatably coupled to the first plate and rotatable away from the first plate from an undeployed position to a deployed position, a panel connected to the first plate and to the second plate, the panel being flexible relative to the first plate and the second plate, and a pyrotechnic activator coupled to the second plate and arranged to, when discharged, rotate the second plate from the undeployed position toward the deployed position. The first plate, the second plate, and the panel form a chamber having an interior volume. One of the first plate or the second plate including a vent hole in communication with the interior volume of the chamber.

The restraint system may further include a seat bottom, and the first plate may be fixed relative to the seat bottom. The first plate may be positioned directly laterally to the seat bottom. When an occupant is seated in the seat bottom and the second plate is in the deployed position, the panel may be directly lateral to a hip of the occupant relative to the seat bottom.

The second plate may extend from a first end at an axis of rotation of the second plate to a second end spaced from the axis of rotation, and when the second plate rotates from the undeployed position to the deployed position, the second end may move in a rearward direction relative to the seat bottom.

The chamber may be sealed except for the vent hole.

The restraint system may further include a flap valve attached to the one of the first plate or the second plate including the vent hole, and the flap valve may be rotatable between a closed position covering the vent hole and an open position exposing the vent hole. The flap valve may include an outlet hole that is aligned with the vent hole when the flap valve is in the closed position, and the outlet hole may have a smaller cross-sectional area than the vent hole does.

The restraint system may further include a cord extending from the pyrotechnic activator to the second plate. Discharging the pyrotechnic activator may exert a tension force on the cord. The restraint system may further include a hinge rotatably coupling the first plate and the second plate, and the pyrotechnic activator may be positioned on an opposite side of the first plate from the second plate in the undeployed position, and the cord may extend from the pyrotechnic activator around the hinge to the second plate when the second plate is in the undeployed position.

The panel may be fabric.

The restraint system may further include a reinforcing rib extending along the panel, and the reinforcing rib may be spaced from the first plate and from the second plate when the second plate is in the deployed position.

The panel may be thermoplastic elastomer.

The panel may have a pleat. The restraint system may further include a hinge rotatably coupling the first plate and the second plate, and the pleat may be elongated from an end at the hinge, and the pleat may be folded when the second plate is in the undeployed position and extended when the second plate is in the deployed position.

The restraint system may further include a hinge rotatably coupling the first plate and the second plate.

Rotating the second plate from the undeployed position toward the deployed position may expand the interior volume of the chamber.

The restraint system may further include a controller communicatively coupled to the pyrotechnic activator, and the controller may be programmed to instruct the pyrotechnic activator to discharge upon receiving data indicating an impact to a vehicle including the restraint system. The controller may be further programmed to prevent the pyrotechnic activator from discharging in response to data indicating a seatback recline angle below a threshold angle.

With reference to the Figures, a restraint system 32 for a vehicle 30 includes a first plate 34, a second plate 36 rotatably coupled to the first plate 34 and rotatable away from the first plate from an undeployed position to a deployed position, a panel 40 connected to the first plate 34 and to the second plate 36, and a pyrotechnic activator 42 coupled to the second plate 36. The panel 40 is flexible relative to the first plate 34 and the second plate 36. The first plate 34, the second plate 36, and the panel 40 form a chamber 44 having an interior volume. The pyrotechnic activator 42 is arranged to, when discharged, rotate the second plate 36 from the undeployed position toward the deployed position. One of the first plate 34 or the second plate 36 includes a vent hole 46 in communication with the interior volume of the chamber 44.

The restraint system 32 can provide support for an occupant's pelvis during an impact to the vehicle 30, e.g., a side impact. The restraint system 32 can be useful in the situation in which a side airbag (not shown) is mounted in a seat back 48 of a seat 50 and can provide support for the occupant's pelvis when the seat back 48 is sufficiently upright but leaves gap when the seat back 48 is sufficiently reclined. When the seat back 48 is reclined in that way, the restraint system 32 can step in with additional support. Moreover, the restraint system 32 can operate without using an inflator. Said differently, the restraint system 32 is inflator-less. As described below, the vent hole 46 is passive such that air is drawn into the chamber 44 through the vent hole 46 as the pyrotechnic activator 42 rotates the second plate 36 toward the deployed position.

With reference to FIG. 1, the vehicle 30 may be any passenger or commercial automobile such as a car, a truck, a sport utility vehicle, a crossover, a van, a minivan, a taxi, a bus, etc.

The vehicle 30 includes a passenger cabin 52 to house occupants, if any, of the vehicle 30. The passenger cabin 52 includes one or more front seats 50 disposed at a front of the passenger cabin 52 and one or more back seats 50 disposed behind the front seats 50. The passenger cabin 52 may also include third-row seats 50 (not shown) at a rear of the passenger cabin 52. In FIG. 1, the front seat 50 is shown to be a bucket seat, but the seats 50 may be other types. The position and orientation of the seats 50 and components thereof may be adjustable by an occupant.

Figure 2:
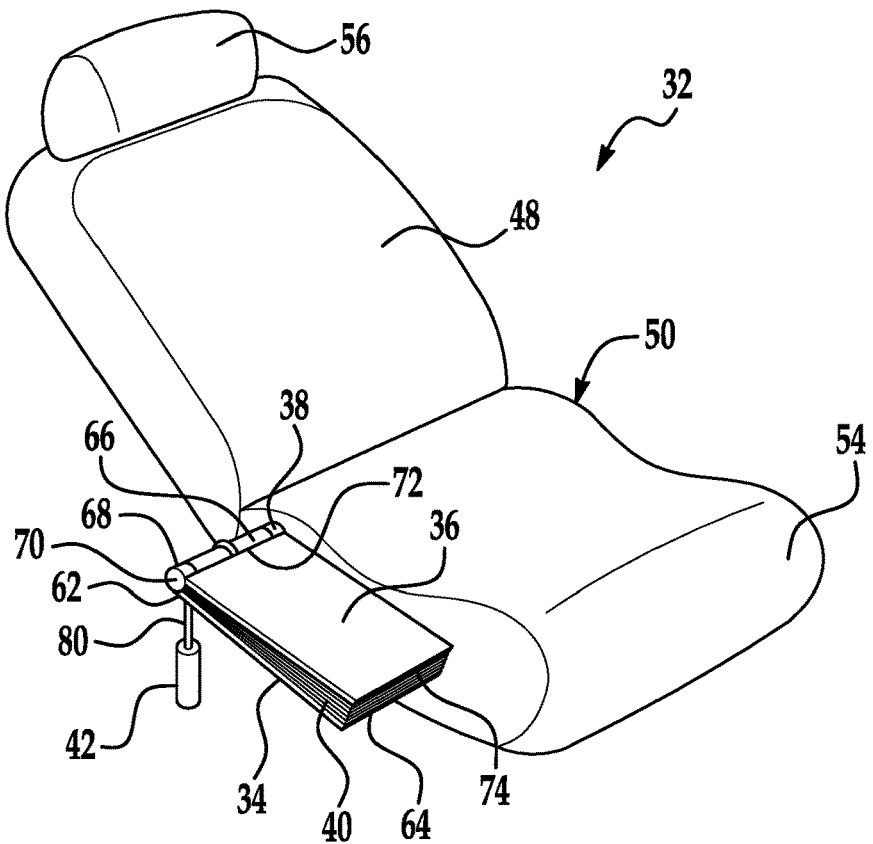
FIG. 2 is a perspective view of a restraint system of the vehicle including a seat and with a second plate in an undeployed position.

With reference to FIG. 2, the seat 50 may include the seat back 48, a seat bottom 54, and a head restraint 56. The head restraint 56 may be supported by the seat back 48 and may be stationary or movable relative to the seat back 48. The seat back 48 may be supported by the seat bottom 54 and may be stationary or movable relative to the seat bottom 54. The seat back 48, the seat bottom 54, and/or the head restraint 56 may be adjustable in multiple degrees of freedom. Specifically, the seat back 48, the seat bottom 54, and/or the head restraint 56 may themselves be adjustable, in other words, adjustable components within the seat back 48, the seat bottom 54, and/or the head restraint 56, and/or may be adjustable relative to each other.

The first plate 34 is fixed relative to the seat bottom 54. The first plate 34 is positioned directly laterally to the seat bottom 54, specifically in an outboard direction from the seat bottom 54, i.e., away from a longitudinal centerline of the vehicle 30. The first plate 34 is directly between the seat bottom 54 and a door of the vehicle 30.

The first plate 34 has a flat shape, e.g., a rectangular shape, that is oriented generally horizontally. The first plate 34 is longer in a longitudinal direction, i.e., a vehicle-forward direction, than in a lateral direction, i.e., a vehicle-outboard direction. The first plate 34 extends from a first end 62 at a hinge 38 to a second end 64 spaced from the hinge 38. The first plate 34 is rigid, i.e., stiff, i.e., has a high Young's modulus. For example, the first plate 34 may be formed of rigid plastic, for example, sheet molding composite (SMC), carbon fiber reinforced plastic (CFRP), fiberglass, and/or other fiber reinforced plastic. Alternatively, the first plate 34 may be formed of metal, e.g., aluminum, steel, etc.

The hinge 38 rotatably couples the first plate 34 and the second plate 36, making the second plate 36 rotatable relative to the first plate 34 about an axis of rotation of the second plate 36 defined by the hinge 38. The hinge 38 may have a first hinge portion 66 fixed relative to the first plate 34, a second hinge portion 68 fixed relative to the second plate 36, and a pin 70 connecting the first hinge portion 66 and the second hinge portion 68. The pin 70 may allow rotational motion of the second hinge portion 68 relative to the first hinge portion 66. The hinge 38 is positioned at the first end 62, i.e., at a vehicle-rearward end, of the first plate 34, i.e., an end of the first plate 34 closest to the seat back 48 along a longitudinal direction.

The second plate 36 has a flat shape, e.g., a rectangular shape. The second plate 36 may have the same shape as the first plate 34. The second plate 36 is longer in a radial direction relative to the hinge 38 than in an axial direction relative to the hinge 38. The second plate 36 extends from a first end 72 at the hinge 38, i.e., at the axis of rotation of the second plate 36, to a second end 74 spaced from the hinge 38. The second plate 36 is rigid, i.e., stiff, i.e., has a high Young's module. For example, the second plate 36 may be formed of rigid plastic, for example, sheet molding composite (SMC), carbon fiber reinforced plastic (CFRP), fiberglass, and/or other fiber reinforced plastic. Alternatively, the second plate 36 may be formed of metal, e.g., aluminum, steel, etc.

Figure 3:
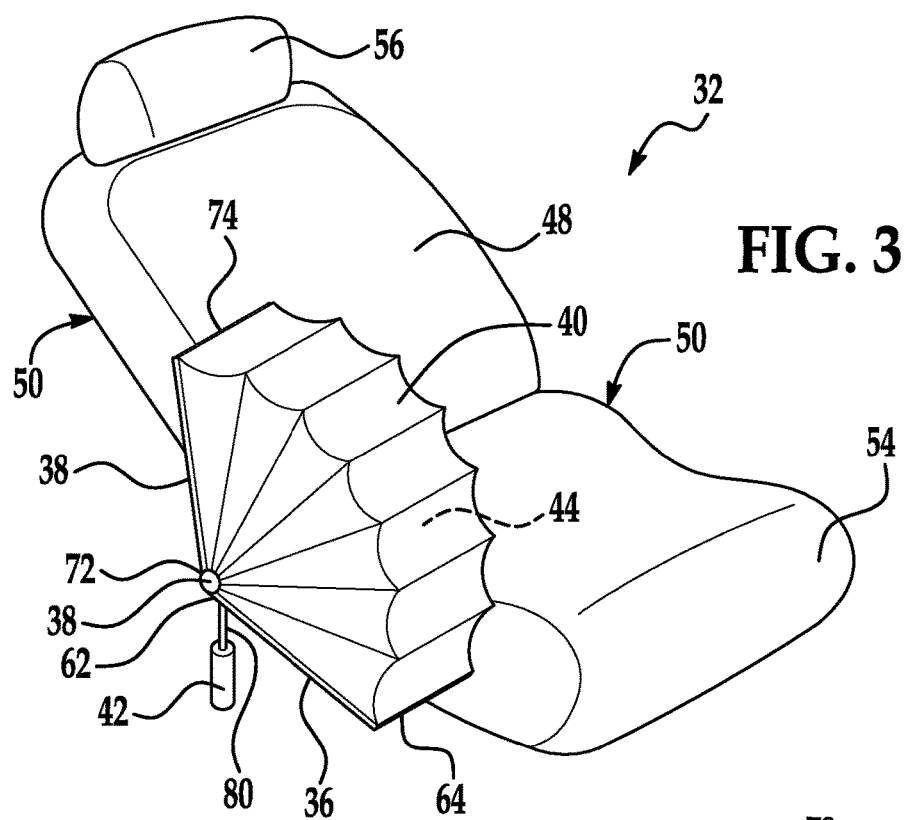
FIG. 3 is a perspective view of the restraint system including the seat with the second plate in the deployed position.

With reference to FIGS. 2 and 3, the second plate 36 is rotatable relative to the first plate 34 from an undeployed position to a deployed position, e.g., via the hinge 38. The second plate 36 in the undeployed position is oriented generally horizontally and close to parallel to the first plate 34 above the first plate 34. The second plate 36 in the undeployed position forms a small angle with the first plate 34 relative to the axis of rotation of the second plate 36, e.g., an angle with its vertex at the axis of rotation of the second plate 36 and its sides extending in the radial direction of the first plate 34 and the radial direction of the second plate 36 from the axis of rotation is less than 5°. When the second plate 36 rotates from the undeployed position to the deployed position, the second end 74 moves in a rearward direction relative to the seat bottom 54, i.e., a vehicle-rearward direction. The second plate 36 has an angular sweep of greater than 90° when rotating from the undeployed position to the deployed position. The second plate 36 in the deployed position forms an obtuse angle with the first plate 34 relative to the axis of rotation, e.g., an angle with its vertex at the hinge 38 and its sides extending in the radial direction of the first plate 34 and the radial direction of the second plate 36 from the axis of rotation is greater than 90°.

Figure 4:
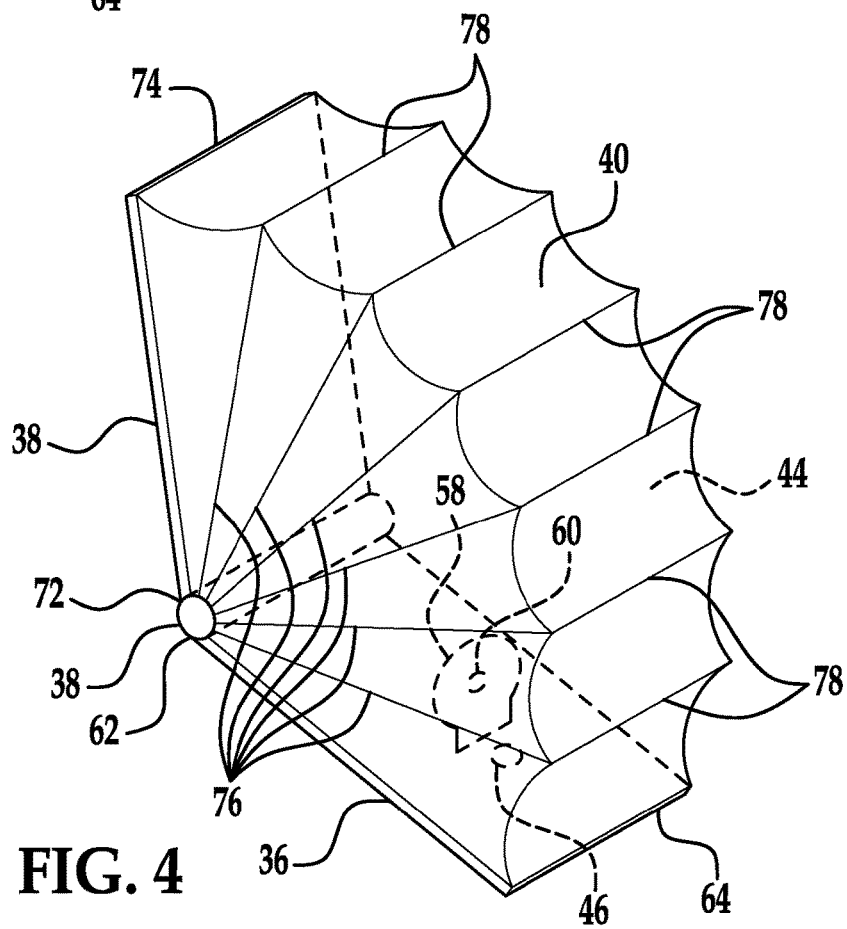
FIG. 4 is a perspective view of a portion of the restraint system with the second plate in the deployed position and a flap valve in an open position.

With reference to FIG. 4, one of the first plate 34 or the second plate 36 includes a vent hole 46. For example, as shown in the Figures, the first plate 34 includes the vent hole 46. The vent hole 46 extends through the first plate 34 (or second plate 36). The vent hole 46 is in communication with the interior volume of the chamber 44. The vent hole 46, when uncovered, permits air to enter or exit the chamber 44. The vent hole 46 is passive, i.e., permits air to pass through but does not actively move air. Said differently, the vent hole 46 has no actuated parts.

Figure 5:
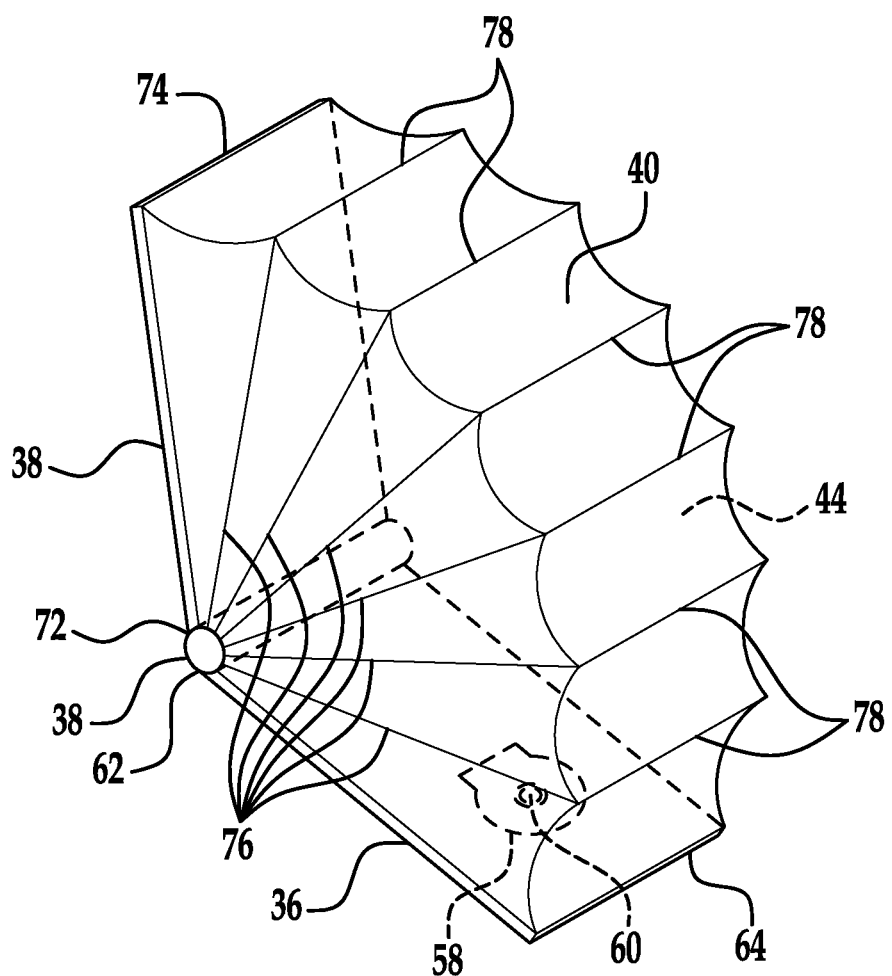
FIG. 5 is a perspective view of a portion of the restraint system with the second plate in the deployed position and the flap valve in a closed position.

With reference to FIGS. 4 and 5, the restraint system 32 includes a flap valve 58 attached to the one of the first plate 34 or the second plate 36 including the vent hole 46, e.g., the first plate 34 as shown in the Figures. The flap valve 58 is rotatable between a closed position covering the vent hole 46, as shown in FIG. 5, and an open position exposing the vent hole 46, as shown in FIG. 4. The flap valve 58 is oriented so that air entering the chamber 44 through the vent hole 46 tends to push the flap valve 58 to the open position, and so that air exiting the chamber 44 through the vent hole 46 tends to push the flap valve 58 to the closed position. The flap valve 58 is passive, i.e., is moved by airflow but does not actively move air. Said differently, the flap valve 58 has no actuated parts.

The flap valve 58 can include an outlet hole 60 that is aligned with the vent hole 46 when the flap valve 58 is in the closed position. The outlet hole 60 has a smaller cross-sectional area than the vent hole 46 does. When the flap valve 58 is in the closed position, air can exit the chamber 44 via the outlet hole 60 and vent hole 46. Because the outlet hole 60 is smaller than the vent hole 46, air can flow through the outlet hole 60 when the flap valve 58 is in the closed position at a slower rate than air can flow through the vent hole 46 when the flap valve 58 is in the open position. The outlet hole 60 is passive, i.e., permits air to pass through but does not actively move air. Said differently, the outlet hole 60 has no actuated parts.

The panel 40 is connected to the first plate 34 and to the second plate 36. The panel 40 is connected to the first plate 34 along a perimeter of the first plate 34 extending from the first end 62 at the hinge 38 to the second end 64, around the second end 64, and back to the first end 62 at the hinge 38. The panel 40 is connected to the second plate 36 along a perimeter of the second plate 36 extending from the first end 72 at the hinge 38 to the second end 74, around the second end 74, and back to the first end 72 at the hinge 38. The combination of the hinge 38 and the connection of the panel 40 to the first plate 34 forms a closed loop, and the combination of the hinge 38 and the connection of the panel 40 to the second plate 36 forms a closed loop.

The panel 40 is flexible relative to the first plate 34 and to the second plate 36. In other words, less force is required to bend the panel 40 than to bend the first plate 34 or the second plate 36 to the same degree. For example, the panel 40 may fabric or thermoplastic elastomer (TPE). For another example, the panel 40 may be the same material as the first plate and the second plate but significantly thinner.

The panel 40 may be formed of a fabric such as a suitable airbag material, for example, a woven polymer. For example, the panel 40 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

Alternatively, the panel 40 may be formed of thermoplastic elastomer (TPE). A thermoplastic elastomer has both thermoplastic and elastomeric properties. A thermoplastic material becomes pliable above a particular temperature and solidifies upon cooling, and an elastomer generally has a low Young's modulus and a high failure strain. Types of TPEs include styrenic block copolymers, thermoplastic olefins, elastomeric alloys, thermoplastic polyurethanes, thermoplastic copolyesters, and thermoplastic polyamides. In this example, the material forming the panel 40 is solid, not woven like a fabric.

The panel 40 includes at least one pleat 76, e.g., a plurality of pleats 76. The pleats 76 are elongated from ends at the hinge 38 generally following the perimeter of the first plate 34. When the second plate 36 is in the undeployed position, the pleats 76 are elongated along a perimeter of the first plate 34 extending from the first end 62 at the hinge 38 to the second end 64, around the second end 64, and back to the first end 62 at the hinge 38. The pleats 76 are folded when the second plate 36 is in the undeployed position, as shown in FIG. 2, and the pleats 76 are extended when the second plate 36 is in the deployed position, as shown in FIGS. 3-5. The pleats 76 may be arranged in an accordion-like fashion or may be folded in any other suitable manner.

The restraint system 32 may include at least one reinforcing rib 78, e.g., a plurality of reinforcing ribs 78, e.g., one reinforcing rib 78 for each pleat 76. Each reinforcing rib 78 can extend along the panel 40 along one of the pleats 76. The reinforcing ribs 78 can be attached to the panel 40 along their length, e.g., inside a sleeve (not shown) of the panel 40 or molded into the plastic forming the panel 40. When the second plate 36 is in the deployed position, the reinforcing ribs 78 are spaced from the first plate 34 and from the second plate 36. The reinforcing ribs 78 may be formed of, e.g., metal, i.e., may be wires.

The first plate 34, the second plate 36, and the panel 40 form the chamber 44; i.e., the first plate 34, the second plate 36, and the panel 40 are parts of the chamber 44 and together define the chamber 44 as a chamber. The chamber 44 has the interior volume, i.e., a space enclosed or mostly enclosed by the chamber 44. The chamber 44 is sealed except for the vent hole 46, i.e., air can only enter or exit the chamber 44 via the vent hole 46.

Returning to FIGS. 2 and 3, the pyrotechnic activator 42 is fixed relative to the seat bottom 54. The pyrotechnic activator 42 is positioned on an opposite side of the first plate 34 from the second plate 36 in the undeployed position; i.e., the pyrotechnic activator 42 is positioned below the first plate 34. The pyrotechnic activator 42 may be of any suitable type, such as a ball-in-tube pyrotechnic activator, in which an explosive charge propels a ball or balls over a cogwheel connected to a cord 80; a piston pyrotechnic activator, in which an explosive charge drives a piston attached to the cord 80; or any other suitable type. The pyrotechnic activator 42 is coupled to the second plate 36 via the cord 80.

The restraint system 32 includes the cord 80. The cord 80 extends from the pyrotechnic activator 42 to the second plate 36. When the second plate 36 is in the undeployed position, the cord 80 extends around the hinge 38 to the second plate 36.

The pyrotechnic activator 42 is arranged to rotate the second plate 36 from the undeployed position toward the deployed position by discharging. Discharging the pyrotechnic activator 42 exerts a tension force on the cord 80. The cord 80 forms a pulley with the hinge 38 and exerts the tension force to pull the second plate 36 upward from the undeployed position and rearward toward the deployed position. Rotating the second plate 36 from the undeployed position toward the deployed position expands the interior volume of the chamber 44, thereby drawing in air through the vent hole 46 to the chamber 44. The action of drawing in the air pushes the flap valve 58 to the open position, as shown in FIG. 4. The reinforcing ribs 78 can help prevent the panel 40 from collapsing in on itself. When an occupant is seated in the seat bottom 54, i.e., in the seat 50, and the second plate 36 is in the deployed position, the panel 40 is directly lateral to a hip of the occupant. The chamber 44 may serve as a bolster for the occupant in the event of sideways momentum of the occupant from an impact to the vehicle 30. After the interior volume of the chamber 44 has fully expanded and starts to decrease, the pressure pushes the flap valve 58 to the closed position, and the outlet hole 60 permits air to slowly exit the chamber 44.

Figure 6:
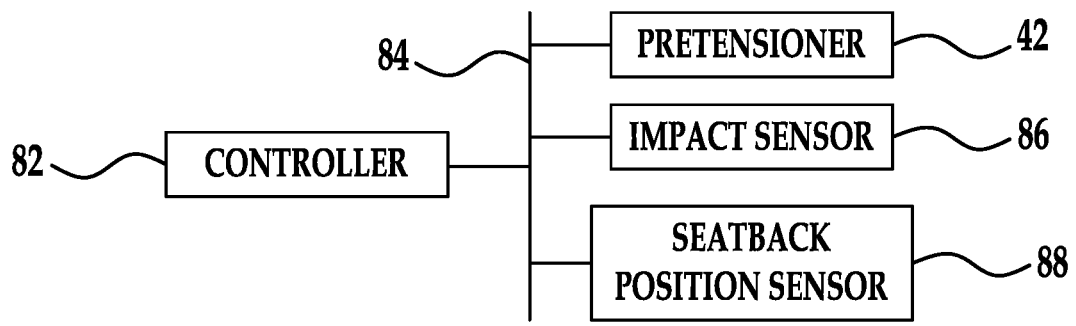
FIG. 6 is a block diagram of a control system of the restraint system.

With reference to FIG. 6, the restraint system 32 includes a controller 82. The controller 82 is a microprocessor-based computing device, e.g., a generic computing device including a processor and a memory, an electronic controller or the like, a field-programmable gate array (FPGA), an application-specific integrated circuit (ASIC), etc. The controller 82 can thus include a processor, a memory, etc. The memory of the controller 82 can include media for storing instructions executable by the processor as well as for electronically storing data and/or databases, and/or the controller 82 can include structures such as the foregoing by which programming is provided. The controller 82 can be multiple computers coupled together.

The controller 82 may transmit and receive data through a communications network 84 such as a controller area network (CAN) bus, Ethernet, WiFi, Local Interconnect Network (LIN), onboard diagnostics connector (OBD-II), and/or by any other wired or wireless communications network. The controller 82 may be communicatively coupled to the pyrotechnic activator 42, an impact sensor 86, a seatback position sensor 88, and other components via the communications network 84.

The impact sensor 86 is adapted to detect an impact to the vehicle 30. The impact sensor 86 may be of any suitable type, for example, post-contact sensors such as linear or angular accelerometers, gyroscopes, pressure sensors, and contact switches; and pre-impact sensors such as radar, LIDAR, and vision-sensing systems. The vision systems may include one or more cameras, CCD image sensors, CMOS image sensors, etc. The impact sensor 86 may be located at numerous points in or on the vehicle 30.

The seatback position sensor 88 may be any sensor providing an output mapping onto a rotational position of the seat back 48 relative to the seat bottom 54, e.g., a capacitive transducer, a capacitive displacement sensor, an eddy-current sensor, an ultrasonic sensor, a Hall effect sensor, an inductive noncontact position sensor, a variable differential transformer, a piezoelectric transducer, a potentiometer, a proximity sensor, a rotary encoder, a string potentiometer, etc.

Figure 7:
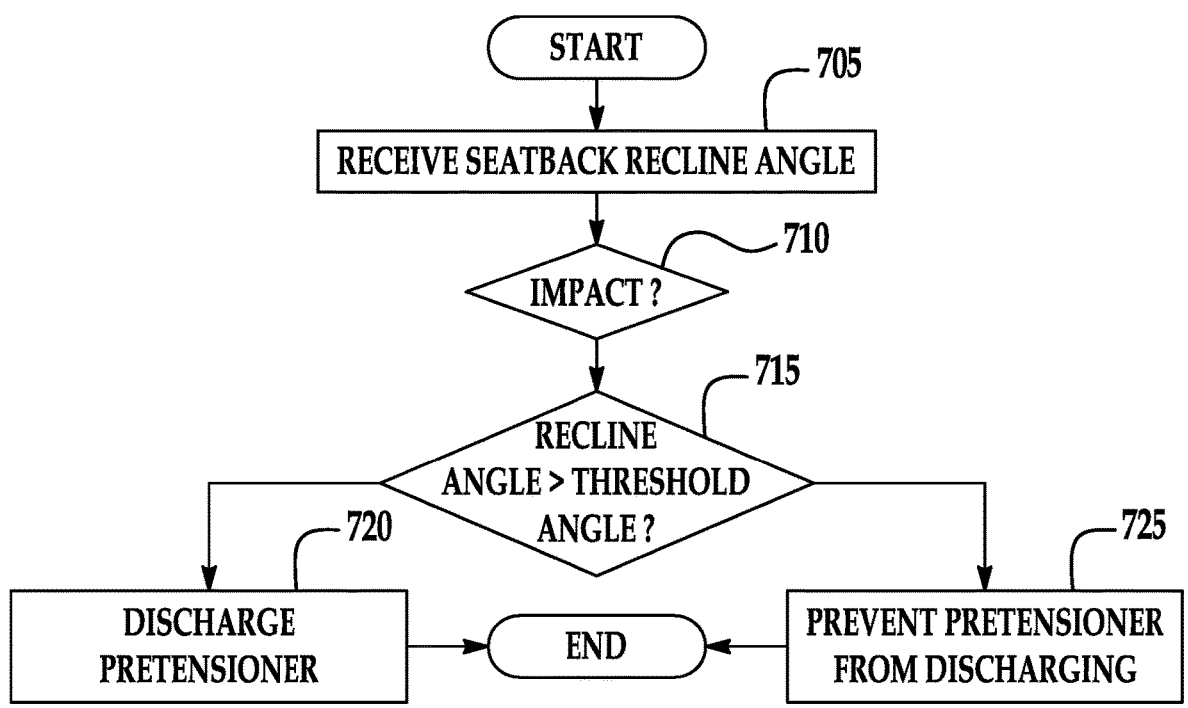
FIG. 7 is a process flow diagram of a process for deploying the restraint system.

FIG. 7 is a process flow diagram illustrating an exemplary process 700 for deploying the restraint system 32, i.e., rotating the second plate 36 from the undeployed position to the deployed position. The memory of the computer stores executable instructions for performing the steps of the process 700 and/or programming can be implemented in structures such as mentioned above. As a general overview of the process 700, upon receiving data indicating an impact to the vehicle 30, the controller 82 instructs the pyrotechnic activator 42 to discharge in response to data indicating a seatback recline angle greater than a threshold angle and prevents the pyrotechnic activator 42 from discharging in response to data indicating the seatback recline angle is less than the threshold angle.

The process 700 begins in a block 705, in which the controller 82 receives data from the seatback position sensor 88 indicating the seatback recline angle of the seat back 48 relative to the seat bottom 54. A greater angle indicates that the occupant has reclined the seat back 48 farther back.

Next, in a decision block 710, the controller 82 determines whether it has received data indicating an impact to the vehicle 30. If the impact sensor 86 has transmitted data indicating an impact to the controller 82, the process 700 proceeds to a decision block 715. If the controller 82 has not received data indicating an impact, the process 700 returns to the block 705 to continue monitoring the seatback recline angle and waiting to receive data indicating an impact.

In the decision block 715, the controller 82 determines whether the seatback recline angle is greater than the threshold angle. The threshold angle is chosen based on whether the seat back 48 far enough forward that a side airbag (not shown) mounted in the seat back 48 can provide support for the occupant's hip in a lateral impact. If the seatback recline angle is greater than the threshold angle, the process 700 proceeds to a block 720. If the seatback recline angle is less than the threshold angle, the process 700 proceeds to a block 725.

In the block 720, the controller 82 instructs the pyrotechnic activator 42 to discharge. The pyrotechnic activator 42 discharges and causes the second plate 36 to move from the undeployed position to the deployed position, putting the chamber 44 in position to serve as a bolster for the occupant. After the block 720, the process 700 ends.

In the block 725, the controller 82 prevents the pyrotechnic activator 42 from discharging. The second plate 36 remains in the undeployed position. After the block 725, the process 700 ends.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance, order, or quantity. Terms such as "front," "forward," "back," "rearward," "left," "right," "lateral," etc., are understood relative to the vehicle 30. Many modifications and variations of the present disclosure are possible in light of the above teachings, and the disclosure may be practiced otherwise than as specifically described.

What is claimed is:

1. A restraint system comprising:
a first plate;
a second plate rotatably coupled to the first plate and rotatable away from the first plate from an undeployed position to a deployed position;
a panel connected to the first plate and to the second plate, the panel being flexible relative to the first plate and the second plate; and
a pyrotechnic activator coupled to the second plate and arranged to, when discharged, rotate the second plate from the undeployed position toward the deployed position;
the first plate, the second plate, and the panel forming a chamber having an interior volume; and
one of the first plate or the second plate including a vent hole in communication with the interior volume of the chamber.

2. The restraint system of claim 1, further comprising a seat bottom, wherein the first plate is fixed relative to the seat bottom.

3. The restraint system of claim 2, wherein the first plate is positioned directly laterally to the seat bottom.

4. The restraint system of claim 3, wherein when an occupant is seated in the seat bottom and the second plate is in the deployed position, the panel is directly lateral to a hip of the occupant relative to the seat bottom.

5. The restraint system of claim 2, wherein the second plate extends from a first end at an axis of rotation of the second plate to a second end spaced from the axis of rotation, and when the second plate rotates from the undeployed position to the deployed position, the second end moves in a rearward direction relative to the seat bottom.

6. The restraint system of claim 1, wherein the chamber is sealed except for the vent hole.

7. The restraint system of claim 1, further comprising a flap valve attached to the one of the first plate or the second plate including the vent hole, wherein the flap valve is rotatable between a closed position covering the vent hole and an open position exposing the vent hole.

8. The restraint system of claim 7, wherein the flap valve includes an outlet hole that is aligned with the vent hole when the flap valve is in the closed position, and the outlet hole has a smaller cross-sectional area than the vent hole does.

9. The restraint system of claim 1, further comprising a cord extending from the pyrotechnic activator to the second plate.

10. The restraint system of claim 9, wherein discharging the pyrotechnic activator exerts a tension force on the cord.

11. The restraint system of claim 10, further comprising a hinge rotatably coupling the first plate and the second plate, wherein the pyrotechnic activator is positioned on an opposite side of the first plate from the second plate in the undeployed position, and the cord extends from the pyrotechnic activator around the hinge to the second plate when the second plate is in the undeployed position.

12. The restraint system of claim 1, wherein the panel is fabric.

13. The restraint system of claim 1, further comprising a reinforcing rib extending along the panel, wherein the reinforcing rib is spaced from the first plate and from the second plate when the second plate is in the deployed position.

14. The restraint system of claim 1, wherein the panel is thermoplastic elastomer.

15. The restraint system of claim 1, wherein the panel has a pleat.

16. The restraint system of claim 15, further comprising a hinge rotatably coupling the first plate and the second plate, wherein the pleat is elongated from an end at the hinge, and the pleat is folded when the second plate is in the undeployed position and extended when the second plate is in the deployed position.

17. The restraint system of claim 1, further comprising a hinge rotatably coupling the first plate and the second plate.

18. The restraint system of claim 1, wherein rotating the second plate from the undeployed position toward the deployed position expands the interior volume of the chamber.

19. The restraint system of claim 1, further comprising a controller communicatively coupled to the pyrotechnic activator, wherein the controller is programmed to instruct the pyrotechnic activator to discharge upon receiving data indicating an impact to a vehicle including the restraint system.

20. The restraint system of claim 19, wherein the controller is further programmed to prevent the pyrotechnic activator from discharging in response to data indicating a seatback recline angle below a threshold angle.

\* \* \* \* \*